United States Patent [19]

Logue

[11] Patent Number: 5,548,212
[45] Date of Patent: Aug. 20, 1996

[54] THICKNESS AND HARDNESS MEASUREMENT APPARATUS UTILIZING A ROTATING INDUCTION VECTOR

[76] Inventor: Delmar L. Logue, R.R. #1, Box 60, Herrick, Ill. 62431

[21] Appl. No.: 388,825

[22] Filed: Feb. 15, 1995

Related U.S. Application Data

[63] Continuation-in-part of Ser. No. 142,933, Oct. 29, 1993.

[51] Int. Cl.$^6$ ............................. G01B 7/06; G01B 7/31; G01N 27/80; B21C 51/00
[52] U.S. Cl. .................... 324/229; 324/207.17; 324/225; 324/233; 324/239; 324/243
[58] Field of Search ...................... 324/207.17, 225–227, 324/229–233, 239–243; 336/229; 72/10–12, 31

[56] References Cited

U.S. PATENT DOCUMENTS

| | | | |
|---|---|---|---|
| 2,116,119 | 5/1938 | Lowenstein | 324/229 |
| 2,226,275 | 12/1940 | Abbott et al. | 324/229 |
| 2,805,677 | 9/1957 | Baird | 324/207.25 X |
| 4,053,827 | 10/1977 | Millette et al. | 324/230 |
| 4,492,115 | 1/1985 | Kahil et al. | 324/229 X |
| 4,595,843 | 6/1986 | Delvecchio et al. | 336/229 X |
| 4,818,935 | 4/1989 | Takahashi et al. | 324/232 |

*Primary Examiner*—Gerard R. Strecker

[57] ABSTRACT

Apparatus for measuring the sidewall thickness of cylindrical articles during in-process ram and die drawing, inclined axis multiple polar sensors induce eddy currents by means of the angular motion of a rotating magnetic field, the signal phase angle representing sidewall thickness, also ram and die centering signals generated. Inclined axis polar sensors also measure both cylindrical and flat article hardness by phase shift.

14 Claims, 4 Drawing Sheets

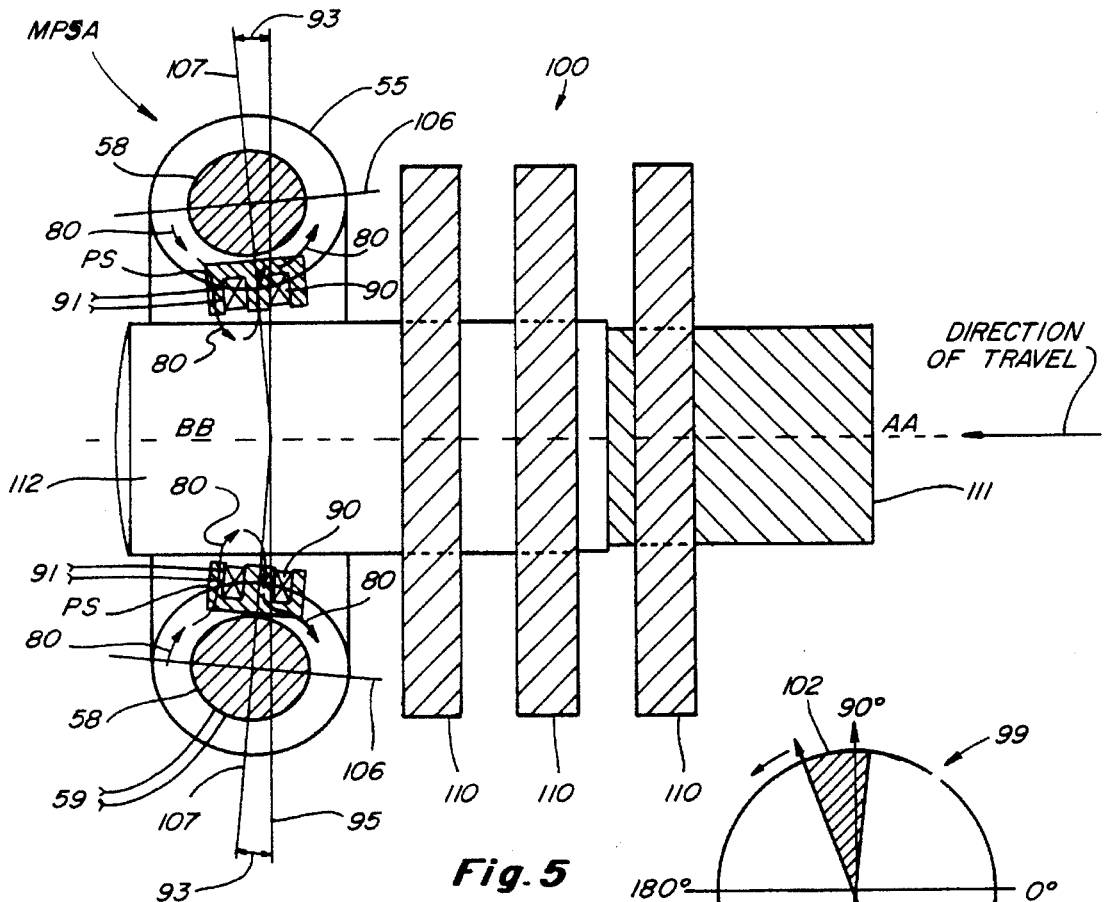
Fig. 5
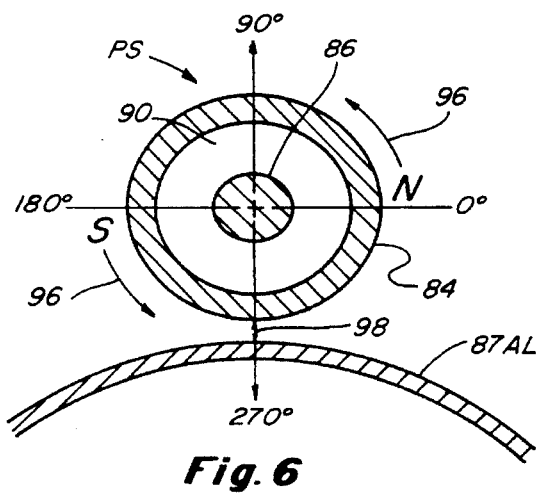
Fig. 6
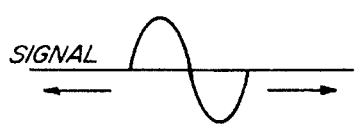
Fig. 6A
Fig. 7
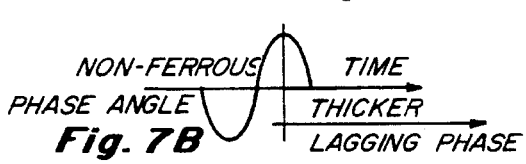
Fig. 7A
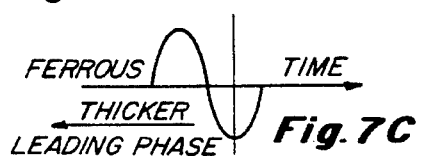
Fig. 7B
Fig. 7C
Fig. 7D

THICKNESS AND HARDNESS MEASUREMENT APPARATUS UTILIZING A ROTATING INDUCTION VECTOR

This application is a continuation in part of copending patent application Ser. No. 08/142,933 entitled "Apparatus for detecting surface flaws in cylindrical articles by means of asymmetric magnetic detection" filed Oct. 29, 1993, by the present applicant. The conception of the present invention was recorded in Disclosure Document No. 369233 filed Jan. 30, 1995.

1. Field of the Invention

The invention relates in general to ferrous or non-ferrous material thickness measurement, and more specifically to a thickness sensor utilizing a rotating magnetic field.

2. Description of the Prior Art

Conventional thickness measurement apparatus have utilized an alternating field (collapsing field) principle to induce eddy currents in the metal workpiece. In measurment applications, variations in the spacing between the probe and the material produce an undesirable signal component which significantly affects the accuracy and reliability of the eddy current test results. The undesired signal is known as probe spacing, probe wobble, or lift-off. Hereinafter, the undesired signal is referred to as "lift-off". Sensor to workpiece distance variation generates a corresponding thickness error. Much effort has been made to reduce this measurement error, i.e. phase rotation circuitry such as taught in the Denton et al. U.S. Pat. No. 4,424,486. The present invention eliminates the need for additional phase rotation circuitry since thickness and hardness is phase shift transduced directly by the polar sensor.

SUMMARY OF THE INVENTION

A very important factor in the manufacture of two-piece aluminum cans is sidewall thickness. Recent efforts have been made to monitor sidewall thickness during the can drawing process by means of collapsing field eddy current sensors. An object of the present invention is to provide an in-line aluminum can sidewall thickness measurement apparatus generating a phase shift signal corresponding to the sidewall thickness. Firstly, the present invention is a thickness measurement apparatus utilizing a rotating magnetic field within a hollow toroid core. The first embodiment of a cylindrical article sidewall thickness measurement apparatus utilizes the multiple sensor driving capability of the hollow toroid driving core to scan the cylindrical article at four longitudinal locations i.e. x-y axes. This x-y scanning may also be utilized for ram and die centering control. This apparatus measures the thickness of both ferrous and non-ferrous cylindrical articles. The instant invention utilizes the polar coordinate sensor (polar sensor) disclosed in Ser. No. 07/842,244 filed Feb. 27, 1992, now U.S. Pat. No. 5,404,101, entitled "Rotary sensing device".

I also utilized polar coordinate sensors in my patent application Ser. No. 08/142,933 filed Oct. 29, 1993, entitled "Apparatus for detecting surface flaws in cylindrical articles by means of asymmetric magnetic detection". The above cited invention utilized the polar coordinate sensor sensing pattern as a 360 degree balanced flux detector. The polar coordinate sensor indicates target direction by the phase angle of the signal, and target distance by the amplitude of the same signal. In the present invention the axis of the polar sensor is inclined at an angle to the surface of the workpiece, this inclined rotating sensing pattern induces eddy currents in the container sidewall. This unbalanced flux pattern links the pick-up coil generating a sine wave signal in which the phase angle varies with the workpiece thickness and amplitude varies with sensor to workpiece spacing. Eddy current induction is by the angular motion of a constant length flux vector. The depth of the eddy current i.e. thickness of the workpiece is the major phase variable when used in this mode. The azimuth heading of the workpiece is the same regardless of sensor to workpiece spacing and therefore the minor phase variable. This means "lift-off" errors are greatly reduced. Sensor to workpiece spacing is the major amplitude variable of polar coordinate sensing, material thickness or hardness being the minor amplitude variable. These amplitude variations may be utilized in a host computer to compensate for minor phase errors due to sensor to workpiece distance variations. This error compensation is performed in the signal processing after amplitude peak detection and zero crossing detection. The inclined axis polar sensor also measures the hardness of ferrous metals by phase shift. A phase shift signal being time dependent, is preferred over an amplitude modulated signal. The principle advantage of measuring thickness or hardness by phase difference is that the amplitude of the signal involved is irrelevant and the circuitry needed to convert a phase difference to a digital signal is more straightforward than that needed to compare signals with different amplitudes.

BRIEF DESCRIPTION OF THE DRAWINGS

The invention may be better understood, and further advantages and uses thereof more readily apparent, when considered in view of the following detailed description of exemplary embodiments taken with the accompanying drawings in which:

FIG. 5 is a longitudinal view of an in line aluminum can drawing process with the multiple polar sensor assembly concentrically surrounding the aluminum can for sidewall thickness measurement.

FIG. 6 is a radial view of the annular shaped polar sensing face illustrating eddy current induction in the can sidewall by the angular motion of a constant length rotating induction vector.

FIG. 6A is a graph illustrating signal phase deviation corresponding to sidewall thickness.

FIG. 7 is a 360 degree phase diagram illustrating ferrous and non-ferrous azimuth locations relating to the polar sensing face.

FIG. 7A is the sine-cosine reference signal.

FIG. 7B illustrates non-ferrous thickness phase-shift response.

FIG. 7C illustrates ferrous thickness phase-shift response,

FIG. 7D illustrates ferrous metal hardness phase-shift response.

DEFINITIONS AND ABBREVIATIONS

Driving core: a hollow toroid core generating a rotating magnetic field, used to drive one or more polar sensors.

Polar sensor: (PS) a rotating field sensor generating a sine wave signal having polar coordinate components i.e. the signal phase angle indicates (1) target direction, (2) target material i.e. ferrous or non-ferrous, (3) target thickness, (4) target hardness. The amplitude of this same signal indicates target distance, (2) target thickness.

Multiple polar sensor assembly: (MPSA) a hollow toroid driving core having more than one mounted polar sensor, for generating a plurality of polar coordinate signals.

DESCRIPTION OF THE PREFERRED EMBODIMENTS

Figure 1:
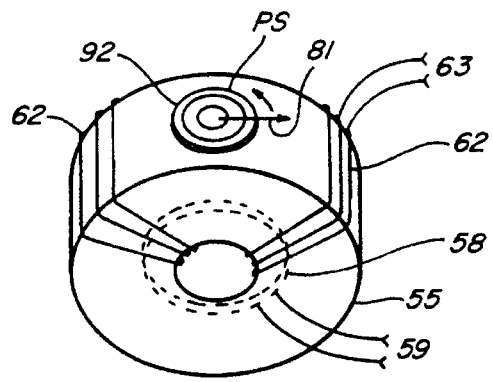
FIG. 1 is a perspective view of a hollow toroid core, having a mounted polar coordinate sensor (PS) which is the fundamental sensing element utilized in the disclosed thickness and hardness measurement apparatus.
Figure 2:
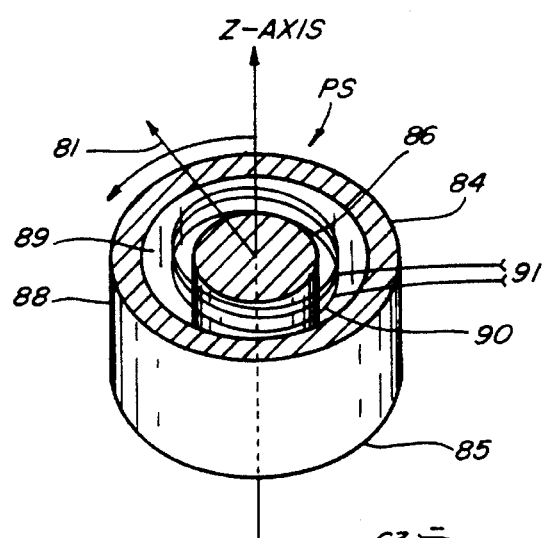
FIG. 2 is an isometric view of a polar sensor (PS).

Referring now to the drawings, and to FIG. 1 in particular, there is shown in perspective view a hollow toroid core 55 formed of a ferromagnetic material such as ferrite. The hollow toroid 55 has an inside excitation winding 58, having connecting leads 59. Winding 58 can induce a magnetic field throughout the entire core. There is an outside toroidal excitation winding 62 having connecting leads 63, this winding can also induce a magnetic field throughout the entire core. The inside and outside excitation windings are connected to two pure sine wave voltage sources (not shown) displaced by 90 degrees. In the preferred sine-cosine generator the two waveforms are constructed by digital means. If the sine wave voltage sources are exactly 90 degrees out of phase a rotating magnetic field is induced throughout the hollow toroid core. This rotating magnetic field has distributive axes perpendicular to the surface of the core 55 at all points. This uniform rotating field may be utilized for eddy current sensing by mounting a polar coordinates sensing element PS in a bore 92 disposed in the outer circumference wall of the hollow toroid. The axis of this bore being perpendicular to the central axis of the hollow toroid 55, e.g. perpendicular to a plane drawn tangent to the surface of the hollow toroid 55. In this position the pick-up coil of FIG. 2 (polar sensor shown in enlarged detail) is positioned coplaner to the rotating flux lines crossing the mounted polar sensor PS. When no target is present there is no flux coupling to the coplaner positioned pick-up coil, and a signal null is obtained. When a metallic target 83 comes within the hemispherical sensing pattern as in FIG. 3, this coplaner flux is unbalanced linking flux lines to pick-up coil 90 generating a sine wave signal. FIG. 2 is an isometric view of polar sensor PS showing the concentric construction. Pick-up core 88 comprises, a central magnetic pole 86 concentrically surrounded by a cylindrical outer magnetic pole 84. The central and outer magnetic poles are concentrically spaced apart to provide an annular pick-up coil space 89. The mentioned pick-up coil 90 is wound around the central magnetic pole 86. The magnetic poles and pick-up coil share the same Z-axis. Pick-up core 88 is formed of a ferromagnetic material such as ferrite; a conventional pot core half without lead slots was used in my prototype. The central and outer magnetic poles are connected by a base portion 85. The thickness of the base portion 85 is approximately one half the thickness of the hollow toroid wall. When mounted in bore 92 pick-up core 88 creates an annular shaped high reluctance area in the hollow toroid wall. This annular shaped high reluctance provides a hemispherical fringing flux sensing pattern. This hemispherical sensing pattern is rotating coaxially with the Z-axis of the pick-up core 88.

Figure 3:
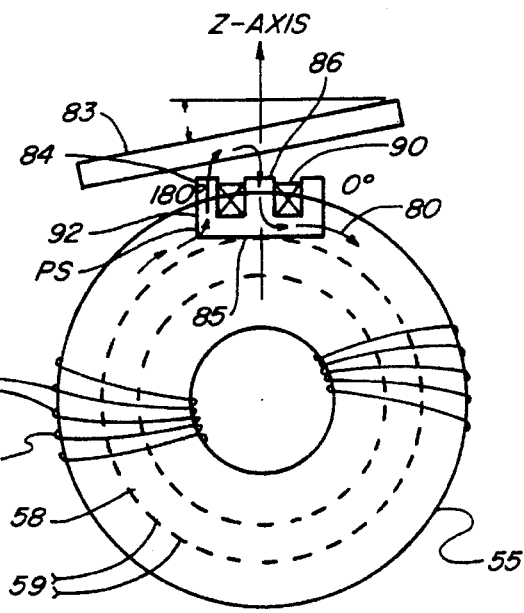
FIG. 3 is a radial view of a hollow toroid core which illustrates the flux lines coupling an inclined target sheet.

The pick-up core 88 is tightly mounted in bore 92 for good flux coupling e.g. a good machined fit. In FIG. 3 a small portion of pick-up core 88 extends beyond the surface of the hollow toroid, this providing a more defined sensing pattern to the workpiece. The unsegmented outer cylindrical magnetic pole 84, of pick-up core 88, provides a very uniform hemispherical sensing pattern that allows a very high angular resolution i.e. phase shift resolution. The pick-up coil connecting leads 91 may be routed out through a small hole in the base portion 85 and from there out through a hole in the wall of the hollow toroid.

Several factors determine the exact phase angle of the generated signal i.e. (1) target azimuth direction, (2) target material (ferrous or nonferrous), (3) conductivity, (4) target thickness, and (5) target hardness. The last two factors (thickness and hardness) were not detected by the inventor at the dates of my previous patent applications; state of the art sine-cosine generators and signal processing equipment has revealed these moderate phase deviations. Referring again to FIG. 3, the rotating induction vector within the hollow toroid driving core 55 causes flux lines 80 to flow up through the outer concentric magnetic pole 84, into the metal plate target 83, down through the central magnetic pole 86, through the base portion 85, and back to the driving core 55. Notice the metal plate target 83 is inclined at a slight angle to the polar sensing face, this causes the rotating sensing pattern to become unbalanced generating the output signal. This inclined axis mode is utilized in the disclosed apparatuses to measure article (both cylindrical and flat sheet) thickness and hardness.

Figure 4:
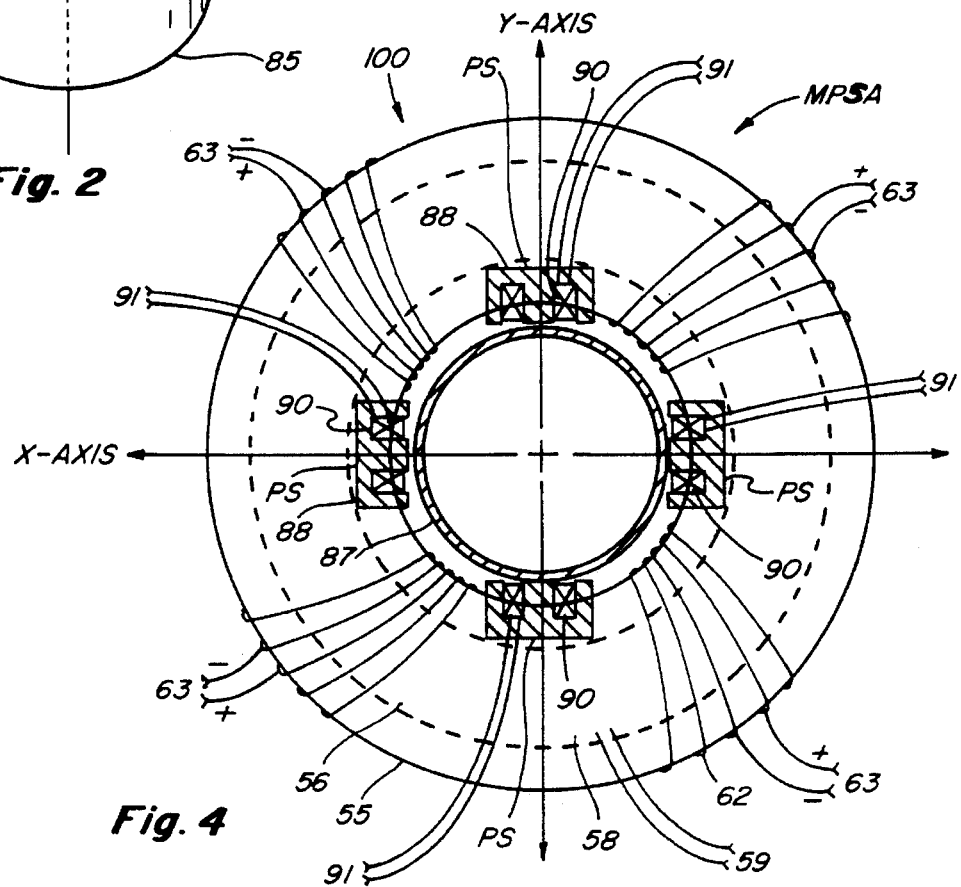
FIG. 4 is a radial view of a multiple polar sensor assembly (MPSA) with two polar sensors on the X-axis and two on the Y-axis.

The first embodiment of an in-process can sidewall thickness measurement apparatus 100 is shown in FIGS. 4, 5. During manufacture, thin sheets of aluminum are pushed through a series of dies 110 by a cylindrical ram 111. Positioned just beyond the final die in FIG. 5 is a multiple polar sensor assembly (MPSA) comprising, a hollow toroid core 55 formed of a high permeability ferromagnetic material such as ferrite.

There is an inside excitation winding 58 (dashed lines), with connecting leads 59. There is also an outside toroidal excitation winding 62 having connecting leads 63. The outside excitation winding 62 may be subdivided as shown into four sub-coils (parallel or series connected) for impedance matching. The sub-coils must be wound symmetrical to the mounted polar sensors for flux balance as shown in FIG. 4. Four polar sensors (PS) are mounted in four bores in the lesser circumference wall on X-Y axes. Although four longitudinal sensing positions are deemed enough, twice the shown number of mounted polar sensors may be used e. g. a polar sensor every 45 degrees around the can sidewall. One driving core can drive several mounted polar sensors simultaneously. Thickness measurement on X-Y axes provides control of ram and die centering. The sensing faces of the polar sensors PS are toward the aluminum can 112, in this way the rotating flux pattern couples to the can sidewall at an inclined angle inducing eddy currents. The sensing flux path is shown in FIG. 5, where the rotating flux flows from the hollow toroid driving core 55 through the outer cylindrical magnetic pole 84, into the can sidewall 112, through the central magnetic pole 86, through the base portion 85, and back to the hollow toroid core. Notice in FIG. 5, the hollow toroid 55 has an elliptical cross section to provide a near flat portion to mount the polar sensors. The major elliptic axis 106, and the minor elliptic axis 107 are inclined to the longitudinal axis AA of container 112. Also the Z-axis of the mounted polar sensors are inclined at an acute angle 93 (3–15 degrees) to a plane 95 perpendicular to the longitudinal axis AA of the container 112. This slight inclination of the polar sensor Z-axis relative to the can sidewall, unbalances the hemispherical sensing pattern, providing flux linkage to the pick-up coils, and generates a sine wave signal in each of the four pick-up coils 90. The central axis BB of the hollow toroid core 55 is disposed coaxially with the longitudinal axis AA of the aluminum can 112. Although an ellipital hollow toroid core cross-section has been shown, a parallelogram shaped cross-section is topologically equivalent to a hollow toroid core, in which the axis of the bores are inclined at an angle to a plane drawn perpendicular to the central axis of the hollow toroid core. It is contemplated this multiple polar sensor assembly (MPSA) may be rigidly mounted in the can stripper finger mechanism (not shown) by means of an encapsulating compound such as Epoxy. Tests have shown that a ferrous plate on the far side (test aluminum sheet between the ferrous plate and the sensing face) of the test aluminum sheet does not affect the thickness measurement. In view of this, a carbide ram 111 inside the aluminum can should not hinder the sidewall thickness measurement. The hollow toroid core 55 is made separable into two halves for assembly. It is contemplated the core separation may be on either the major or minor ellipital axes. Referring now to FIG. 6, to explain the thickness measurement principle utilized in the invention. FIG. 6 is an isometric radial view of the polar sensing face, showing the cylindrical outer magnetic pole 84, the central magnetic pole 86, and the pick-up coil 90. The Z-axis of polar sensor PS is shown angled to the cylindrical aluminum article 87AL (a fragmentary view of a container wall) for unbalanced flux coupling. The polar sensing face is laid out in four quadrants for azimuth reference. The constant length rotating flux vector coupling across the cylindrical outer pole of the pick-up core 88 acts as a annular shaped permanent magnet 96 spinning at ultra high speed. Eddy current induction is by angular field motion in contrast to the collapsing field of conventional eddy current thickness gauges. The 270 degree azimuth of PS is proximate to sidewall of cylindrical non-ferrous article 87AL, thus the induced eddy currents repel the sensing pattern toward the 90 degree azimuth, but the resultant phase angle depends also on the sidewall thickness of container 87AL. FIG. 6A illustrates how the signal phase angle shifts with changing target thickness. To explain the reasoning behind "lift-off" error reduction, refer again to FIG. 6, the 270 degree azimuth heading remains the same regardless of variations in sensor to workpiece spacing 98.

Figure 12:
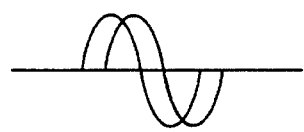
FIG. 12 is the sine-cosine waveforms used to excite the driving core.
Figure 13:
FIG. 13 is a schematic of the inside and outside excitation windings.
Figure 14:
FIG. 14 is a schematic if the poly-phase polar sensor pick-up coils.

Tests have shown "lift-off" error is reduced by a substantial factor. Tests have also shown the phase deviation in the 0.004"–0.006" thickness range has at least 3 degrees phase shift per 0.001" of article thickness. If the individual sine-cosine excitation signals are of equal magnitude and out of phase exactly 90 degrees, the tip of the induction vector traces out a circle. This circular induction vector is coupled to the workpiece by the unsegmented pick-up core 88 providing a sensor having near infinite angular resolution. This near infinite angular resolution provides a very high thickness resolution and accuracy. The hollow toroid driving core 55 may be operated at saturation level, eliminating hysteresis losses, (refer to the DelVecchio et al. U.S. Pat. No. 4,595,843 col. 3 line 39). Also operating at saturation level increases the sensing range. The sine-cosine excitation waveforms are shown in FIG. 12. FIG. 13 is a schematic of the inside 58 and outside 62 excitation windings. Refering now to FIG. 7, which is a 360 degree phase diagram illustrating the phase shift response of the invention to both ferrous and non-ferrous metal sheets. This circular diagram relates to polar sensing face azimuth position (reference degrees are arbitrarily chosen for convenience). The shaded area 102 is the phase deviation range for non-ferrous sheets having progressively thicker dimensions. As the non-ferrous sheets get thicker the phase angle lags as shown in FIG. 7B. The sine-cosine excitation reference signal is shown in FIG. 7A. The shaded area 101 is the phase deviation range for ferrous sheets having progressively thicker dimensions. As the ferrous sheets get thicker the phase angle leads as shown in FIG. 7C. The phase deviation ranges shown in FIG. 7 are only approximate since eddy current penetration depth depends on field rotation speed i. e. sine-cosine excitation frequency. It is contemplated selectable frequency excitation sources be used with the disclosed embodiments.

Figure 8:
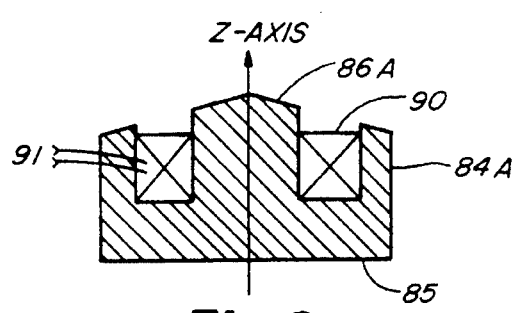
FIG. 8 is a cross sectional view of a conical sensing face polar sensor.
Figure 9:
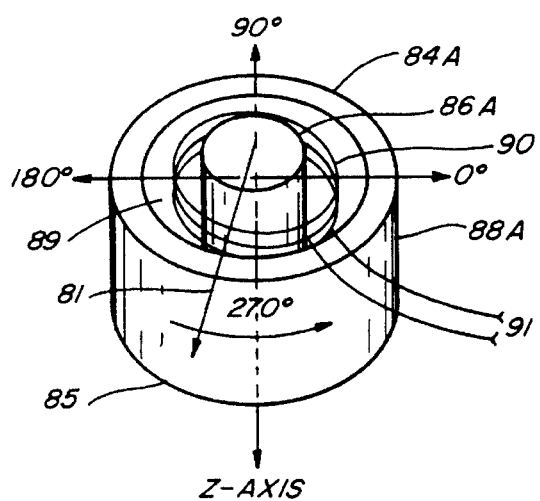
FIG. 9 is a perspective view of a conical sensing face polar sensor.
Figure 10:
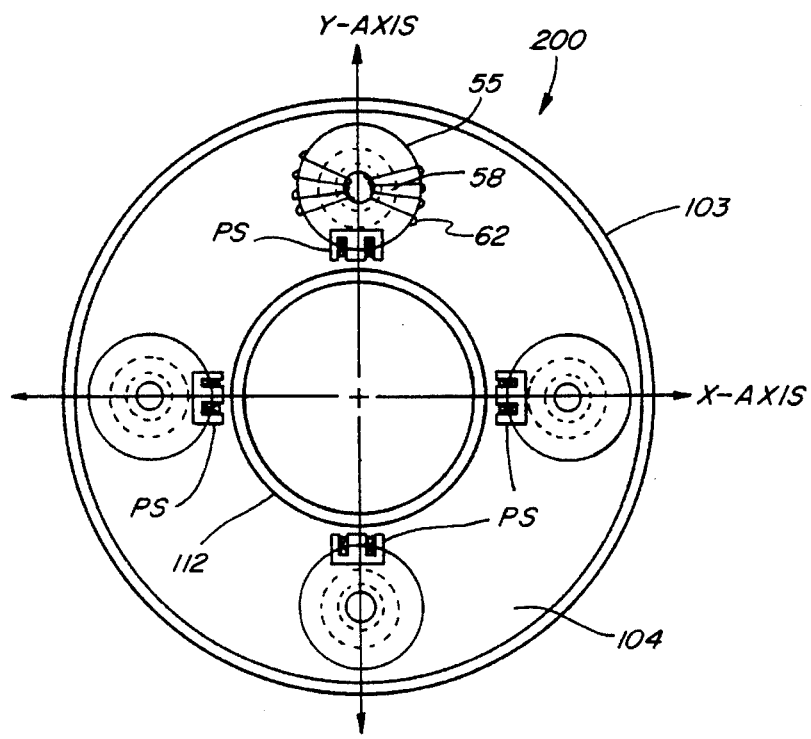
FIG. 10 is a radial view of a container being scanned on x-y longitudinal axes.
Figure 11:
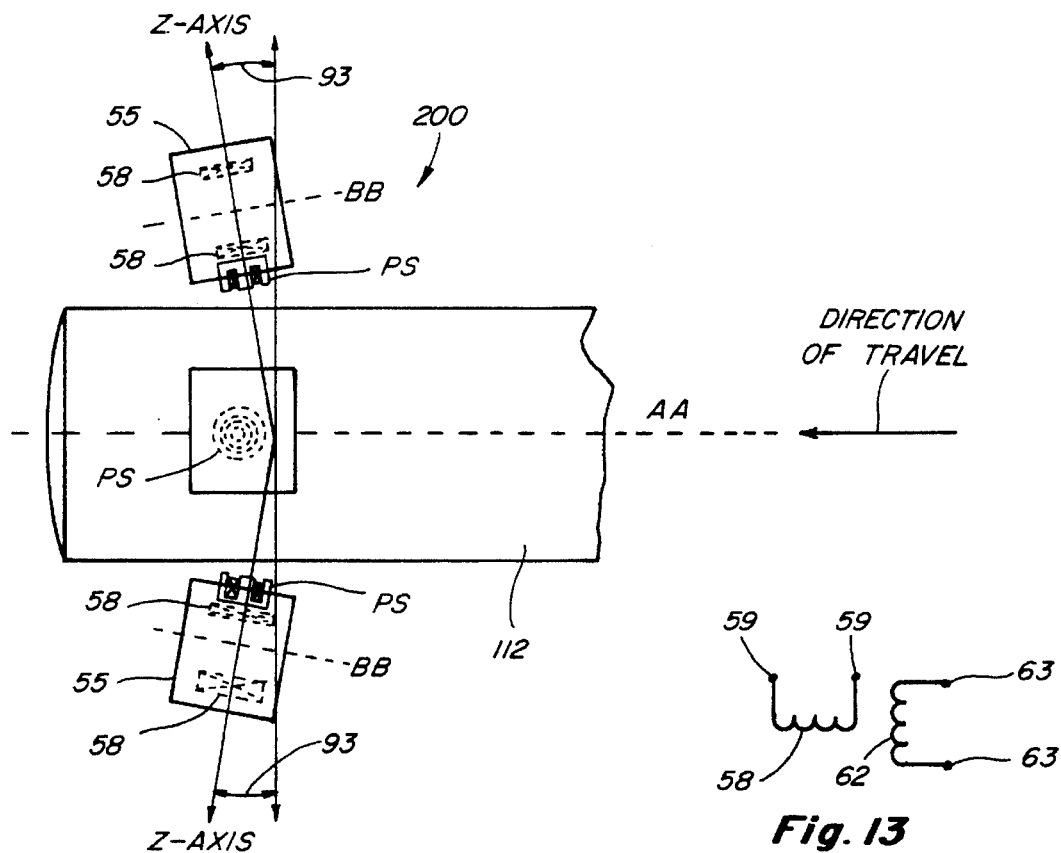
FIG. 11 is a longitudinal view of a in-process clylindrical article sidewall thickness measurement apparatus according to the invention.

Although the phase deviations shown are modest, they can be easily detected with well known zero crossing detector circuits and processed to a very high resolution. This very high thickness resolution may be utilized to control the sidewall thickness to a high degree of accuracy. Ram centering (x-y axes) may also be monitored and controlled by suitable processing of the polar signals. A second embodiment of an in-process can sidewall thickness measurement apparatus 200 is shown in FIGS. 10, 11 (the forming dies and ram are not shown in these drawings). As in the first embodiment the polar sensors are postioned just beyond the final die. Sidewall thickness measurement apparatus 200 utilizes the single polar sensor embodiment of FIGS. 1, 2, 3. The polar coordinate sensor principles will not be repeated here for brevity (same reference numbers). As seen in FIG. 10, four polar sensors PS are arranged on X-Y axes to scan the container sidewall 112 as it emerges from the final die. Although four longitudinal sensing positions are deemed enough, twice the shown number of polar sensors may be used i.e. a polar sensor every 45 degrees around container 112. It is contemplated the polar sensors PS may be rigidly mounted in the aforementioned stripper finger mechanism 103 by means of an encapsulating compound 104. As in the first embodiment, the Z-axis of the mounted polar sensors are inclined at an angle 93, (3–15 degrees) to the longitudinal axis AA of container 112 for unbalanced flux coupling to the can sidewall to generate eddy currents therein. The sensing flux path is the same as the first embodiment of FIG. 5. For improved inclined axis flux coupling to the workpiece, a conical sensing face polar sensor is shown in FIGS. 8, 9. This embodiment is the same as the embodiment of FIG. 2, except the outer cylindrical 84A and central 86A magnetic poles have a conical shape.

Figure 8A:
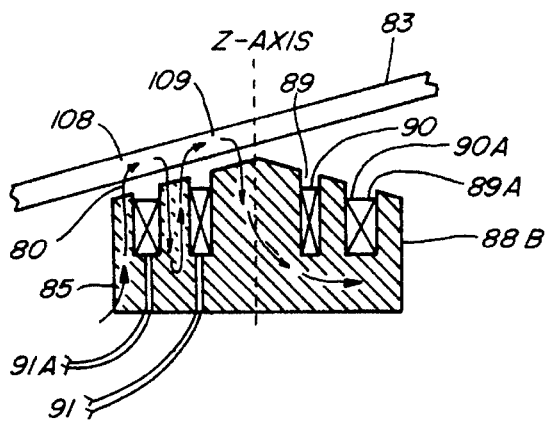
FIG. 8A is a cross-section view of a poly-phase polar sensor having a conical sensing face.
Figure 9A:
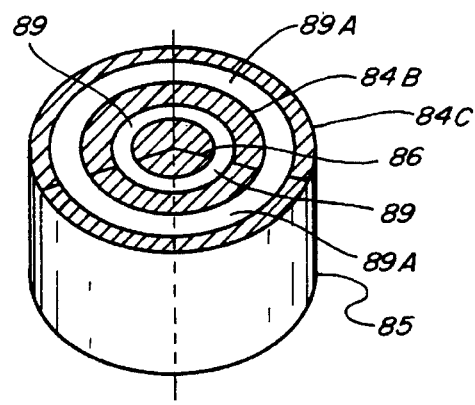
FIG. 9A is a perspective view of a poly-phase polar sensor having a conical sensing face.
Figure 15:
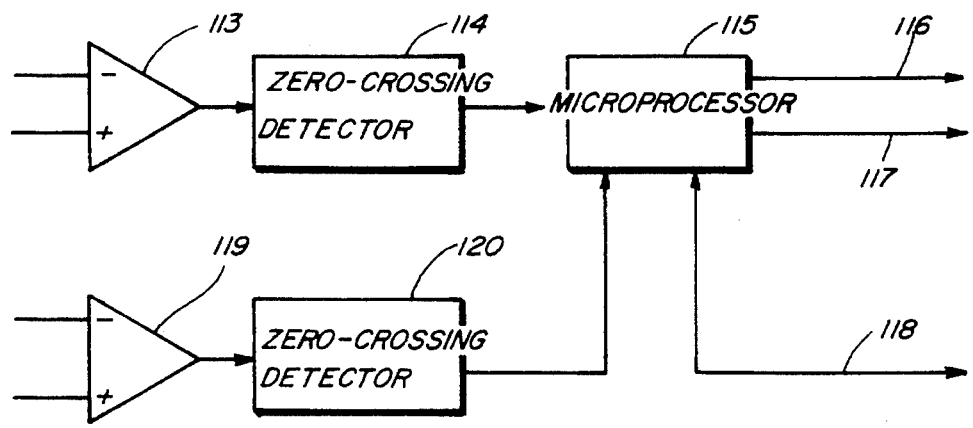
FIG. 15 is an example signal processing circuit for use with the preferred embodiments.

The conical angle CC should correspond to the axis inclination angle of the mounted polar sensors. The rotating induction vector 81, is shown in FIG. 9. FIGS. 8A, 9A, show a third embodiment of polar sening element e.g. a polyphase conical sensing face polar sensor having two pick-up coils 90 and 90A. This poly-phase version uses principles disclosed in my parent patent application Ser. No. 07/842, 244. The poly-phase pick-up core 88B has two pick-up coil spaces 89, and 89A with corresponding pick-up coils 90, and 90A, having connecting leads 91, 91A routed out through two small holes in the base portion 85. The conical sensing face is for the same purpose as the single-phase polar sensor of FIGS. 8, 9, i.e. to improve the inclined axis flux coupling to target 83. The two signals generated by pick-up coils 90 and 90A, may be used to extract more thickness or hardness information. Poly-phase pick-up core 88B couples flux in two slightly different axial positions 108, 109 to the can sidewall. If the can sidewall is not a perfect cylinder i.e. axially out of alignment, there will be a small phase difference between the signals generated by pick-up coils 90 and 90A. Although the two embodiments of in-process thickness measurement apparatuses have been shown inspecting aluminun cans, they are also suitable for in-process thickness measurement of ferrous cans. The second embodiment in FIGS. 10, 11 is suitable to measure the thickness of ferrous or non-ferrous tubing, since the individual polar sensors PS and driving cores 55 do not induce circulating currents in the tubing because there is no closed magnetic loop around the tube specimen. As aforementioned, the polar sensor in an inclined axis mode may also be used to measure the hardness of ferrous metals. The remanence effect of the hardness causes a lagging phase angle as shown in FIG. 7D. Although the inclined axis polar sensor has been shown measuring the sidewall thickness of cylindrical articles such as containers and tubing, flat sheet material such as steel may also be measured for thickness and hardness. The testing procedure is the same as shown in FIG. 3, where the Z-axis of the polar sensor PS is inclined at an acute angle to the workpiece metal sheet 83 (ferrous or non-ferrous). Several inclined axis polar sensors may be arranged in a row traverse to a moving sheet of metal such as aluminum foil to measure thickness during in-process manufacture (not shown). FIG. 15 is an example signal processing circuit for all the embodiments of this disclosure. The output signal from a polar sensor is fed to the differential amplifier 113, from there to a precision zero crossing detector 114. From zero crossing detector 114 the extracted phase angle is sent to a microprocesor unit 115 for phase comparison to sine-cosine excitation reference signal 118. Microprocessor 115 generates a feedback control signal 116 which may control the ram and die centering. Sidewall thickness and concentricity information may be generated on output 117, for display. The poly-phase polar sensor signals are connected to differential amplifiers 113, 119, and phase comparison is made in microprocessor 115. Microprocessor 115 may also contain an amplitude peak detector for measuring sensor to workpiece spacing. Any minor phase errors resulting from sensor to workpiece spacing variation may be compensated for by suitable circuitry included in the signal processing means by utilizing the amplitude component of the polar coordinate signal. This microprocessor generated compensation signal should reduce any "liftoff" error to a very small factor.

I claim:

1. Apparatus for measuring the sidewall thickness of a non-ferrous cylindrical article having a central longitudinal axis with x-y centering coordinates during an in-process ram and die drawing operation, the said apparatus comprising:

a) a multiple polar sensor assembly for inducing eddy currents in the said article sidewall generating polar coordinates signals by the angular motion of a rotating magnetic field, each polar sensor coupling a rotating magnetic field to the workpiece and generating a sine wave signal, the phase angle of which primarily represents article sidewall thickness and the amplitude primarily represents sensor to workpiece distance, first and second polar sensors being disposed on the x-axis of the cylindrical article, third and fourth polar sensors disposed on the y-axis of the cylindrical article, said multiple polar sensor assembly further comprising:
   i) a hollow toroid core formed of a high permeability ferromagnetic material having four bores in the inner circumference wall on the said x-y axes, the hollow toroid core also having an elliptical shaped toroidal cross-section, the minor elliptical axis of the toroidal cross-section being disposed at an acute angle to a plane drawn perpendicular to the central axis of the hollow toroid core, the said acute angle forming the sides of a cone, the said plane forming the base of the cone, the axes of said bores being disposed on the sides of the cone and on radial lines radiating from the central axis of the hollow toroid core, and also being disposed on the said minor elliptical axis;
   ii) the four polar sensors being mounted partially within the four bores as to provide an extending portion outside the surface of the hollow toroid core for coupling the rotating magnetic field to the workpiece;
   iii) a first excitation winding wound within the hollow toroid core for inducing a first magnetic field throughout the hollow toroid core;
   iv) a second excitation winding wound around the outside of the hollow toroid core, being subdivided and wound between the extending portion of the mounted polar sensors for flux symmetry, said second excitation winding for inducing a second magnetic field throughout the hollow toroid core;
   v) sine-cosine excitation being applied to the first and second excitation windings for inducing a rotating magnetic field throughout the hollow toroid core;
   vi) the hollow toroid core being separable for assembly;
   vii) signal processing means to receive the polar coordinates signals to determine the phase angle and amplitude indicating the thickness of said cylindrical article sidewall and determining the ram and die centering on the x-y axes of the cylindrical article.

2. The invention according to claim 1, wherein each of the polar sensors comprise:

a) a pick-up core formed of a high permeability ferromagnetic material, further comprising:
   i) a central cylindrical magnetic pole, a cylindrical outer magnetic pole concentrically surrounding the central cylindrical magnetic pole and spaced apart to provide a pick-up coil space and: a base portion for connecting these magnetic poles at one end, the end opposite the base portion forming an annular sensing face, said annular sensing face being perpendicular to the axis of the central and outer magnetic poles, the sensing face for coupling the rotating magnetic field to the sidewall of the cylindrical article;
   ii) a pick-up coil wound around the central magnetic pole, and being disposed coplanar to the rotating magnetic field for a signal null when no target is present.

3. The invention according to claim 1, wherein the axis of the mounted polar sensors are inclined at an acute angle to a plane drawn perpendicular to the central axis of the hollow toroid core to provide an unbalanced flux coupling to the cylindrical article sidewall and generating a signal in the pick-up coil having a phase angle representing the sidewall thickness and an amplitude in porportion to sensor-workpiece spacing.

4. The polar sensor according to claim 2, wherein the said polar sensor further comprises:
   i) a conical sensing face wherein the central cylindrical magnetic pole is elongated forming a cone concentric with the outer cylindrical magnetic pole for greater flux coupling to the workpiece.

5. The invention of claim 1, further defined as a ferrous cylindrical article sidewall thickness measurement apparatus, the resultant signal phase angle differing by approximately 180 degrees compared to the non-ferrous workpiece signal.

6. The invention according to claim 2, wherein the said polar sensor generates at least two polar coordinates signals sinultaneously for greater thickness measurement resolution, said sensor further comprising:
   a) a pick-up core formed of a high permeability ferromagnetic material, further comprising:
      i) a central first pole around which is wound a first pick-up coil for generating a first polar coordinates signal;
      ii) a cylindrical second pole concentrically disposed around the first pole and first pick-up coil;
      iii) a second pick-up coil being wound around the cylindrical second pole for generating a second polar coordinates signal;
      iv) an outer cylindrical third pole disposed concentrically around the cylindrical second pick-up pole and second pick-up coil;
      v) a base portion for connecting these three poles.

7. The invention as defined in claim 6, further comprising:
   i) a conical sensing face wherein the central first pole and the cylindrical second pole are elongated forming a cone concentric with the outer cylindrical pole for greater flux coupling to the workpiece.

8. A method of utilizing four polar coordinates sensor assemblies for measuring the sidewall thickness of a non-ferrous cylindrical article having a central longitudinal axis, the article also having x-y axes for centering, during an in-process ram and die drawing operation, the said method comprising the steps of:
   a) arranging four polar sensor assemblies on the said x-y axes in proximity to the article sidewall outer surface there being:
   b) a first and second polar sensor assembly disposed on the x-axis and:
   c) a third and fourth polar sensor assembly disposed on the y-axis; each of the said polar sensor assemblies comprising:
   d) a hollow toroid driving core formed of a high pereability ferromagnetic material, and having a bore in the outer circumference wall, the axis of said bore being perpendicular to the central axis of the hollow toroid driving core;
   e) a polar sensor pick-up assembly mounted partially within the bore, the extending portion outside the driving core wall forming
   f) a sensing face for coupling the rotating magnetic field to the specimen article sidewall for eddy current induction;
   g) a first excitation winding wound within the hollow toroid core for inducing a first magnetic field throughout the hollow toroid core;
   h) a second excitation winding wound around the outside of the hollow toroid core, being wound symmetrically to the mounted polar sensor pick-up for flux balance, the second excitation winding for inducing a second magnetic field throughout the hollow toroid core;
   i) sine-cosine excitation being applied to the first and second excitation windings for inducing a rotating magnetic field throughout the hollow toroid core, said field having distributive axes perpendicular to the surface of the hollow toroid core at all points;
   j) each said polar sensor pick-up assembly further comprises:
   k) a pick-up core formed of a high permeability ferromagnetic material, assembly further comprising:
   l) a central cylindrical magnetic pole, a cylindrical outer magnetic pole concentrically disposed around the central cylindrical magnetic pole, and spaced apart to provide a pick-up coil space, and a base portion for connecting these magnetic poles at one end, the end opposite the base portion forming an annular sensing face, said annular sensing face being perpendicular to the axis of the central and outer magnetic poles;
   m) a pick-up coil wound around the central magnetic pole, said pick-up coil being coplanar to the rotating magnetic field and flux balanced for a signal null when no workpiece is present;
   n) the annular sensing face axis being disposed at an angle to the cylindrical article sidewall outer surface for an unbalanced flux coupling to the pick-up coil generating a polar coordinates signal, the signal phase angle compared to the sine-cosine excitation represents the sidewall thickness and; the signal amplitude primarily representing sensor to workpiece spacing;
   o) signal processing means to receive the generated polar coordinates signals for determining sidewall thickness.

9. The method according to claim 8, wherein the annular sensing face axis is disposed at an acute angle to a plane drawn perpendicular to the longitudinal axis of the cylindrical article for unbalanced flux coupling to the pick-up coil.

10. The method according to claim 8, further defined as a ferrous cylindrical article sidewall thickness measurement method, wherein the generated signal phase angle is approximately 180 degrees out of phase compared to the non-ferrous article signal.

11. The method as define in claim 8, wherein the said pick-up assembly is further defined as a poly-phase pick-up assembly for generating at least two polar coordinate signals simultaneously, said assembly comprising:
   a) a pick-up core formed of a high permeability ferromagnetic material, further comprising:
      ii) a central first pole around which a first pick-up coil for generating a first polar coordinates signal;
      iii) a cylindrical second pole concentrically disposed around the first pole and the first pick-up coil;
      iv) a second pick-up coil being wound around the cylindrical second pole for generating a second polar coordinates signal;
   an outer cylindrical third pole disposed concentrically around the cylindrical second pole and second pick-up coil;
   a base portion for connecting these three poles.

12. The method as defined in claim 8, being further defined as a ferrous cylindrical article thickness measurement method, wherein the generated polar coordinates signals differ by approximately 180 degrees compared to the non-ferrous signal.

13. The method as defined in claim 8, being further defined as a non-ferrous sheet article thickness measurement method, further comprising the steps of:

i) arrangingat least one of the said polar coordinates sensor assemblies in proximity to the non-ferrous sheet article, the axis of the annular sensing face being disposed at an acute angle to a line drawn perpendicular to the plane of the said sheet article for unbalanced flux coupling to the pick-up coil;

ii) processing the generated polar coordinates sigal to determine specimen thickness by means of the signal phase angle.

14. The method as defined in claim 13, being further defined as a ferrous sheet article thickness measurement method, wherein the generated polar signal differs in phase by approximately 180 degrees as compared to the non-ferrous specimen signal.

* * * * *